(12) United States Patent
Palich et al.

(10) Patent No.: US 7,272,471 B1
(45) Date of Patent: Sep. 18, 2007

(54) COMPUTER-READABLE MEDIA, METHODS, AND SYSTEMS FOR COMPUTER TACTICAL OPERATION

(75) Inventors: Mark E. Palich, Gilbert, AZ (US); Paul Gieske, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 10/795,613

(22) Filed: Mar. 8, 2004

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl. .............................. 701/3; 701/24; 701/36; 701/207; 701/211; 701/212; 340/991; 340/995.14; 340/995.17

(58) Field of Classification Search ............ 701/23–25, 701/200–201, 207–213, 14, 120–122, 3, 701/36; 340/988–991, 995.1, 995.12, 995.14, 340/995.17, 995.19, 995.24, 996
See application file for complete search history.

(56) References Cited

U.S. PATENT DOCUMENTS

| 4,270,141 | A | 5/1981 | Sakamoto | 358/525 |
| 4,442,495 | A | 4/1984 | Sukonick | 345/24 |
| 4,477,829 | A | 10/1984 | Ziman et al. | 348/207.99 |
| 4,489,389 | A | 12/1984 | Beckwith et al. | 345/421 |
| 5,243,530 | A * | 9/1993 | Stanifer et al. | 701/219 |
| 5,353,009 | A * | 10/1994 | Marsh et al. | 340/505 |
| 5,459,667 | A * | 10/1995 | Odagaki et al. | 701/209 |
| 5,515,285 | A * | 5/1996 | Garrett et al. | 701/300 |
| 5,742,509 | A * | 4/1998 | Goldberg et al. | 701/211 |
| 6,661,353 | B1 * | 12/2003 | Gopen | 340/973 |
| 6,836,728 | B2 * | 12/2004 | Shimabara | 701/212 |
| 2003/0167120 | A1* | 9/2003 | Kawasaki | 701/209 |

FOREIGN PATENT DOCUMENTS

WO    WO 8500911 A1 *    2/1985

* cited by examiner

*Primary Examiner*—Gertrude A. Jeanglaude
(74) *Attorney, Agent, or Firm*—Lee & Hayes, PLLC (57) ABSTRACT

Computer-readable media, methods, and systems for computer tactical operation are provided. First computer program code to facilitate a communication with a remote station. Second computer program code to identify from the communication a position of the remote station associated with the communication. Third computer program code to present a map of an area around the position and display a symbol on the map representing the position. Fourth computer program code to present a message interface showing at least a portion of additional content of the communication associated with the position.

67 Claims, 7 Drawing Sheets

COMPUTER-READABLE MEDIA, METHODS, AND SYSTEMS FOR COMPUTER TACTICAL OPERATION

FIELD OF THE INVENTION

This invention relates generally to data communications and, more specifically, to digital communications with remote stations.

BACKGROUND OF THE INVENTION

Computers have spread to nearly all aspects of contemporary life. To name just one example, a few decades ago automobiles were largely mechanical devices, with mechanical engine controls, analog radios, and basic manually controlled climate systems. Today, on the other hand, automobile engines, transmissions, and even suspensions are controlled by on-board computers. On-board entertainment systems include digital and/or satellite audio systems and telephones. In addition to, or instead of, analog gauges, computerized displays provide information about speed, course of travel, and other information of interest.

Airborne vehicles similarly have advanced both in civilian and military contexts. Information that once was monitored with analog gauges and controlled by analog switches and potentiometers are now monitored on display screens and controlled by keystrokes or pointing-device cues.

For example, military aircraft, such as Longbow APACHE helicopters, employ digital communications systems for communicating with each other. No longer limited to analog radio transmissions, pilots and other on-board personnel can relay information about observed targets and other information to other helicopters using digital burst transmissions. Further, with the ability to transmit significant amounts of information in less time than would be required to relay the same information by communicating the same information verbally over a radio, communications traffic is reduced which, in turn, serves to reduce the risk of detection and maintain security of the aircraft.

Unfortunately, although sophisticated aircraft can communicate with each other via advanced on-board computers and electronic systems, ground stations have not been able to equally partake in the communications system with such aircraft. Previously, when aircraft communicated using analog radios, all that was needed was a compatible radio or walkie-talkie to confer with the aircraft. With aircraft communicating computer-to-computer using digital burst transmissions, ground stations, particularly moving ground stations, have no longer been able to fully engage in the communication with the aircraft.

Thus, there is an unmet need in the art to endow ground stations with communications systems operable to fully communicate with on-board digital communications systems aboard aircraft and at other locations.

SUMMARY OF THE INVENTION

Embodiments of the present invention allow for a user to use a computer to participate in a digital communications network with remote stations having their own digital communications systems. For example, AH-64D aircraft such as Longbow APACHE helicopters have on-board communications systems that facilitate digital communications with other similarly-equipped aircraft. Embodiments of the present invention advantageously allow a user at a ground station or in a different vehicle without AH-64D type communications equipment to fully participate in communications with the aircraft. In particular, using a portable laptop or a notebook computer equipped with an appropriate interface card coupled with a compatible radio, the user can participate in the communications network from any type of location. As a result, a ground commander can fully communicate with one or more aircraft pilots through the aircraft onboard communications systems just as other pilots can. Moreover, a ground commander can fully communicate with aircraft or aircraft subsystems from a ground station as fully as other aircraft and aircraft pilots can communicate with one another. Embodiments of the present invention present both maps showing positions of remote stations, and content of messages sent from those stations. As a result, the user can view locations where the remote locations are located and/or about which the remote stations are reporting, as well as view the content of the communications. Moreover, the user can also send messages to other participants in the network to provide information or give directives.

More particularly, the present invention provides computer-readable media, methods, and systems for computer tactical operation. In one embodiment, a computer-readable media includes a first computer program portion adapted to facilitate a communication with a remote station. A second computer program portion identifies from the communication a position of the remote station associated with the communication. A third computer program portion presents a map of an area around the position and displays a symbol on the map representing the position. A fourth computer program portion presents a message interface showing at least a portion of additional content of the communication associated with the position. Similarly, methods and systems for computer tactical operation also are provided.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to data communications and, more specifically, to digital communications between aircraft and remote, ground-based stations. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

By way of overview, embodiments of the present invention provide computer-readable media, methods, and systems for computer tactical operation. In one embodiment, a computer-readable medium includes a first computer program portion adapted to facilitate a communication with a remote station. A second computer program portion identifies from the communication a position of the remote station associated with the communication. A third computer program portion presents a map of an area around the position and displays a symbol on the map representing the position. A fourth computer program portion presents a message interface showing at least a portion of additional content of the communication associated with the position.

Figure 1:
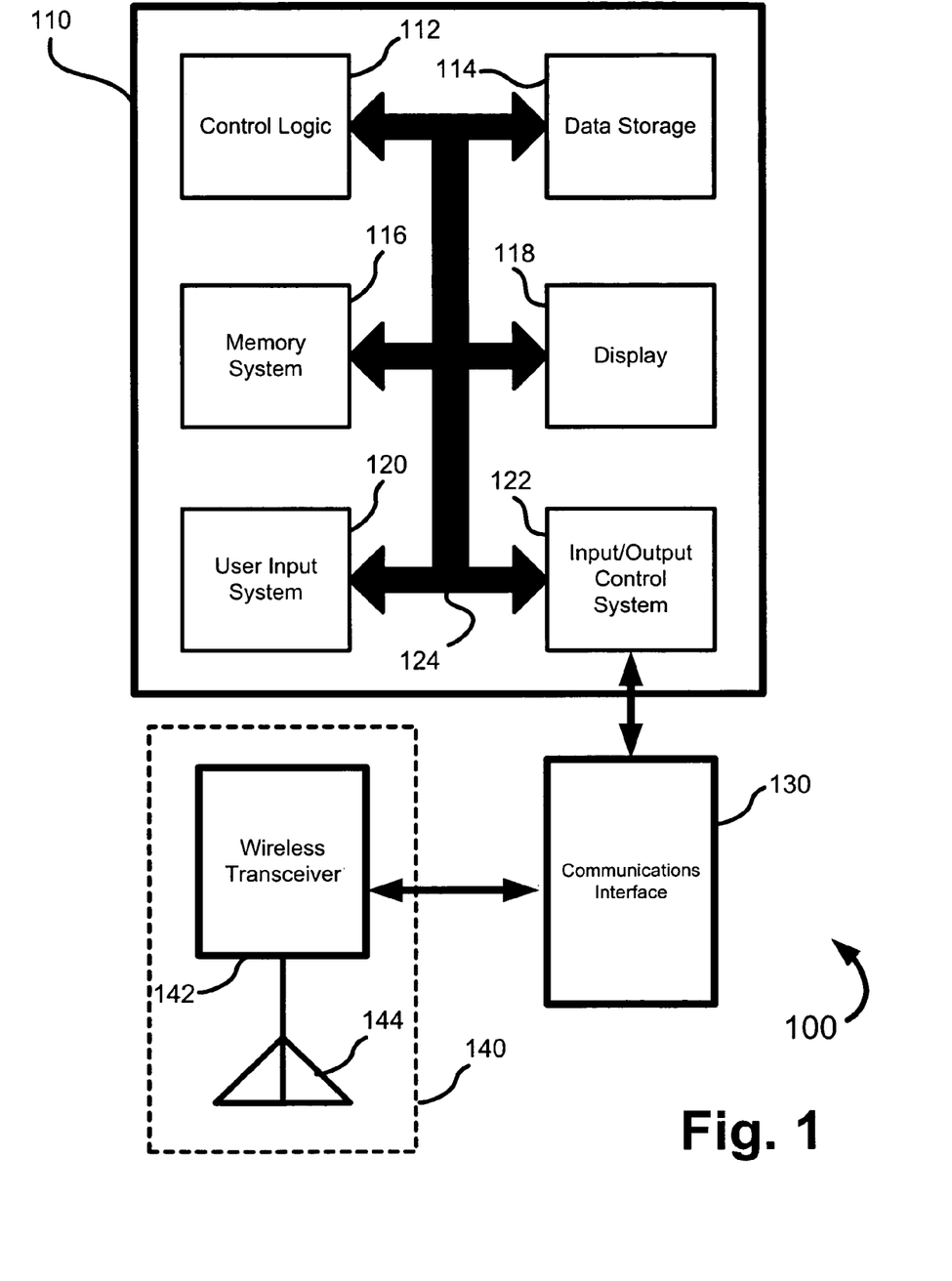
FIG. 1 is a block diagram of a station for communication with other remote stations according to an embodiment of the present invention.

FIG. 1 shows a system 100 of the present invention for creating, sending, receiving, and/or relaying messages according to an embodiment of the present invention. The system 100 represents a node on a network which may include many possible nodes. The system 100 includes a computer system 110, which in one presently preferred embodiment includes a laptop or notebook computer running a Microsoft® Windows® operating system. The system 100 also includes a communications interface 130 and a communications system 140.

The computer system 110 includes control logic 112, program and data storage 114, a memory system 116, a display 118, a user input subsystem 120, and an input/output control system 122, all of which interact through one or more system busses or channels 124. The control logic 112 may include a microprocessor and related support logic. The program and data storage 114 may include at least one fixed disk drive, as well as one or more diskette, CD-ROM, flash memory, or similar devices. The memory system 116 includes a plurality of random access memory devices suitably configured to support running of the operating system and application programs. One or more of the components of the computer system 110, such as, for example, the program and data storage 114, the memory system 116, or any other desired computer-readable media may include computer instructions, computer code, or other forms of computer-readable information that are adapted to perform methods of data communication in accordance with embodiments of the present invention, as described more fully below.

The display 118 in one embodiment is a color LCD or similar all-points addressable display. The user input subsystem 120 may include a keyboard, a pointing device such as a mouse, trackball, touchpad or similar device with appropriate input keys configured to allow a user to interact with a graphical user interface system which will be described in more detail below. The input/output control system 122 allows the computer system 110 to interface with one or more output devices through standard interfaces such as PCMIA adapters, USB ports, or similar input/output channels. The system busses or channels 124 allow the subsystems 112, 114, 116, 118, 120, and 122 of the computer system 110 to intercommunicate.

Coupled with the computer system 110 is a communications interface 130. In one embodiment, the communications interface 130 includes a personal computer improved data modem (PCIDM) device configured to interface with the computer system 110 via the input/output control system 122 of the computer system. More particularly, in one particular embodiment of the system, the communications interface is a PCMIA PCIDM card-type modem which interfaces with the PCMIA adapter associated with the input/output subsystem 122 of the computer system. PCMIA PCIDM card-type devices are available from Innovative Concepts, Inc., of McLean, Va., such as the PCIDM V2 device, a Type II PCMIA device. The PCIDM device is a combined modem and router that supports digital communications as will be further described.

Coupled with the communications interface is a communications system 140. In one embodiment, the communications system 140 includes a wireless transceiver 142 and an antenna 144. The wireless transceiver 142 suitably includes systems with synchronous interfaces or asynchronous interfaces. Both types of systems are supported by the previously mentioned PCIDM device. The wireless transceiver 142, in one particular embodiment, includes a radio such as a single channel ground and airborne radio system (SINCGARS) such as the RT-1523A or RT-1523E manufactured by ITT Industries of White Plains, N.Y. Other systems operable to work with the PCIDM interface include, but are not limited to, other systems manufactured by the Raytheon Company of Waltham, Mass., including SINGCGARS systems such as PRC-113, the ARC-164, ARC-186, and ARC-201-D, as well as Multiband Intra-Team Radio (MBITR) systems such as the PRC-117F and PRC-148 systems. The antenna 144 may include an OE-254 very high frequency (VHF) antenna manufactured by R.A. Miller Industries of Grand Haven, Mich.

An object of the communications interface 130 and communications system 140 is to interface with onboard communications systems used in aircraft, such as, for example, the Longbow Apache helicopter. The PCIDM device may support Application Message Sets, including message sets for Air Force Application Program Development (AFAPD) Apache and F-16, Joint Variable Message Format (JVMF), Tactical Fire Direction System (TACFIRE), and other message formats used by aircraft onboard systems. The SINCGARS radio system similarly is a standard military radio transceiver incorporated in military aircraft. Thus, use of a PCIDM device and a SINCGARS radio transceiver enables a user provided with a system 100 to communicate with a plurality of aircraft or other users similarly equipped.

Figure 2:
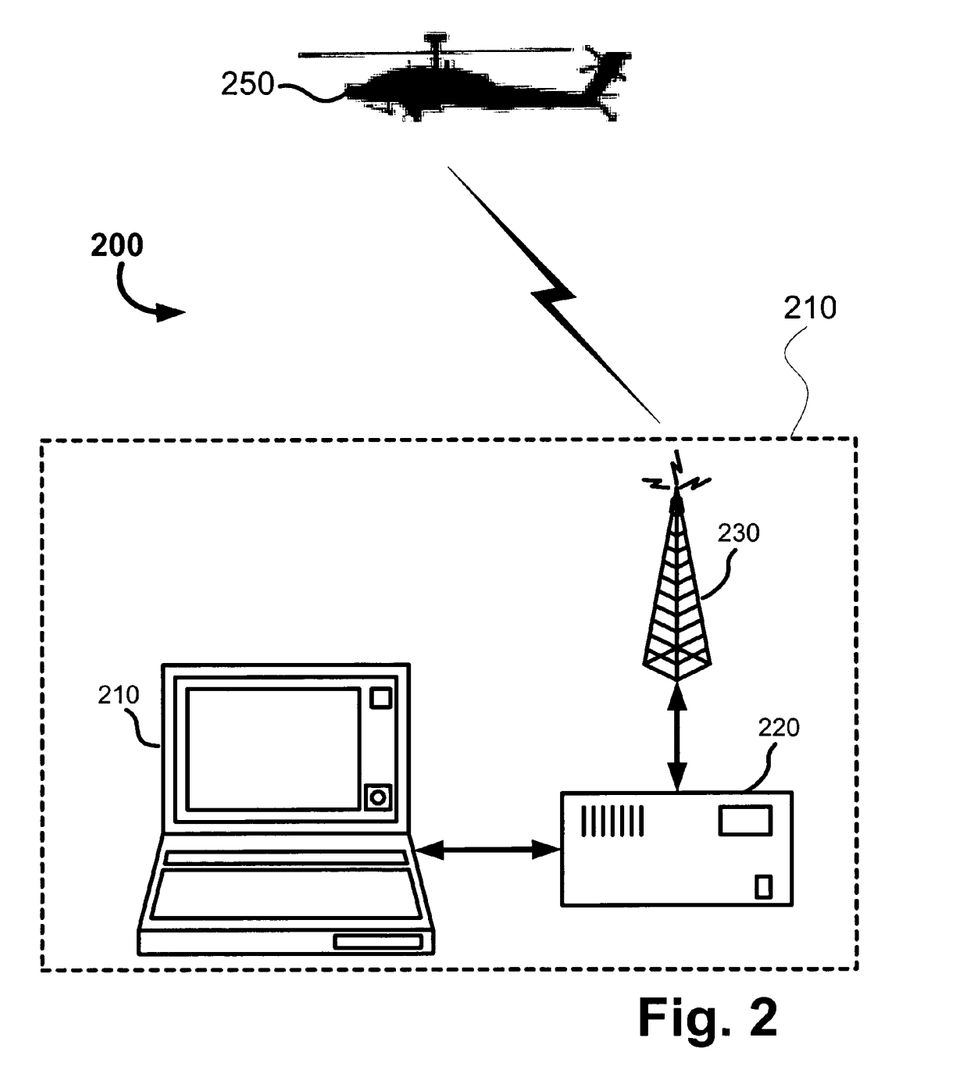
FIG. 2 is a schematic of a station including the system of FIG. 1 communicating with a remote station aboard an aircraft.

FIG. 2 is a schematic of a network 200 including a system 210 according to an embodiment of the present invention for communicating with a remote station including an aircraft 250. In this case, the remote station 250 includes an AH-64D Longbow APACHE helicopter. The system 200 includes a portable computer 210 including the components and functionality of the computer system 110 of FIG. 1. In one embodiment, a portable computer 210, such as a laptop or notebook computer, is used to afford maximum portability to various stations. For field use in particular, a ruggedized portable computer is preferable to ensure functionality in a variety of deployment situations. One particular embodiment of the present invention includes a portable computer 210 supporting a Microsoft® Windows® operating environment such as Windows 95®, Windows 98®, Windows NT® or a similar environment.

Coupled with the portable computer 210 via a PCIDM interface (preferably mounted in a PCMIA slot in the portable computer 210 and thus not shown in FIG. 2) is a radio transceiver 220 such as the SINCGARS radio previously described. Coupled with the radio transceiver 220 is an antenna 230 such as the OE-254 VHF antenna previously described.

In one representative embodiment of the present invention, the system 210 allows a user (not shown) to participate in the network 200 with the aircraft 250 and/or other similarly equipped stations. For example, the Longbow APACHE helicopter includes a digital onboard communications system allowing aircraft to communicate across a digital network. Embodiments of the present invention provide computer-readable media for computers, methods, and systems for a user not posted within the aircraft 250 or at another dedicated station to participate in the communications network 200. Accordingly, a ground commander working with an aircraft 250 or a group of aircraft 250 can communicate with the aircraft 250 digitally to provide previously described advantages.

Figure 3:
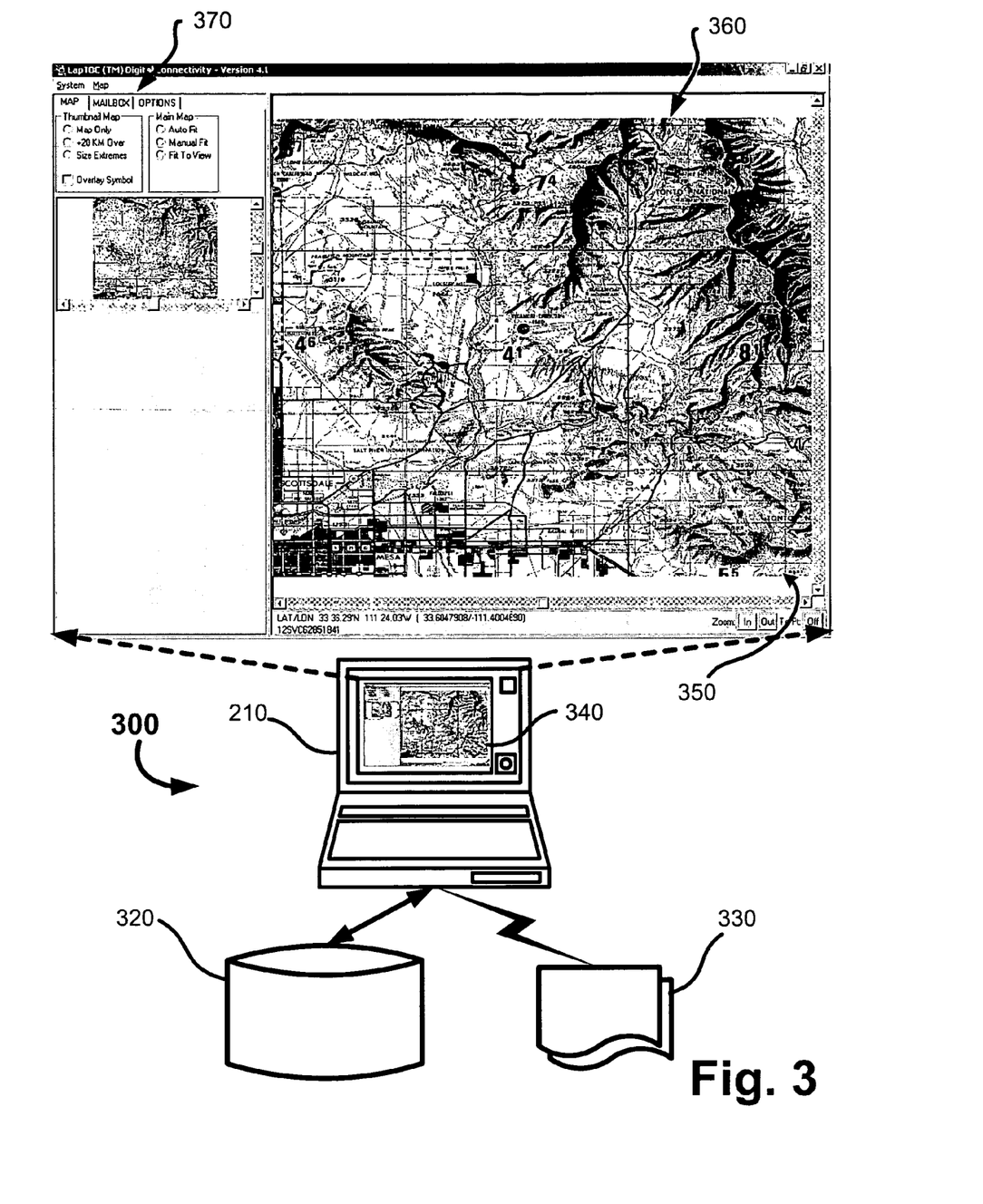
FIG. 3 is a schematic diagram of the station interacting with a map database and communications exchanged with other stations to display a position associated with the communication.

FIG. 3 is a schematic diagram of the system 300 interacting with a map database 320 and communications 330 exchanged with other stations to display a position associated with the communications 330. The portable computer 210 includes a display 340 operable to present a graphical image 350. The graphical image 350 is generated by instructions stored on a computer-readable medium (not shown) including instructions according to an embodiment of the present invention. The graphical image 350 includes a map 360 and a message interface 370. The map 360 and the message interface 370 allow the user to interact with the system 200, such as to receive and view information contained in communications 330 received, to generate communications 330, and to perform other functions supported by the system 210 (FIG. 2). In one embodiment, the map 360 and the message interface 370 both are presented using a graphical user interface (GUI) allowing the user to interact with the system 200 using a pointing device such as a mouse, touchpad, trackball, or similar pointing device. The manner in which a user interacts with the system 200 is further described below in connection with FIGS. 6 and 7.

The system 300 extracts information from the map database 320 as needed to obtain relevant mapping data to show the position associated with communications 330 exchanged by the system 300. As will be further described, communications 330 are associated with positions. The position associated with the communication includes longitude and latitude or similar positioning data. The positioning data may represent a location of a target, a position from which no targets were observed, or other information similar information. Using the positioning data, the system 300 map extract map data which encompasses the position reflected by the positioning data. The system 300 can work with any map database 320 from which mapping data can be accessed by providing coordinates reflecting positioning information. In one embodiment, the system 300 interacts with an application program interface associated with the map database to extract the map data to present the map 360 including a position of interest. The map data base 320 may reside locally within the system or be accessible by the system through a support network to obtain the desired mapping data.

Figure 4:
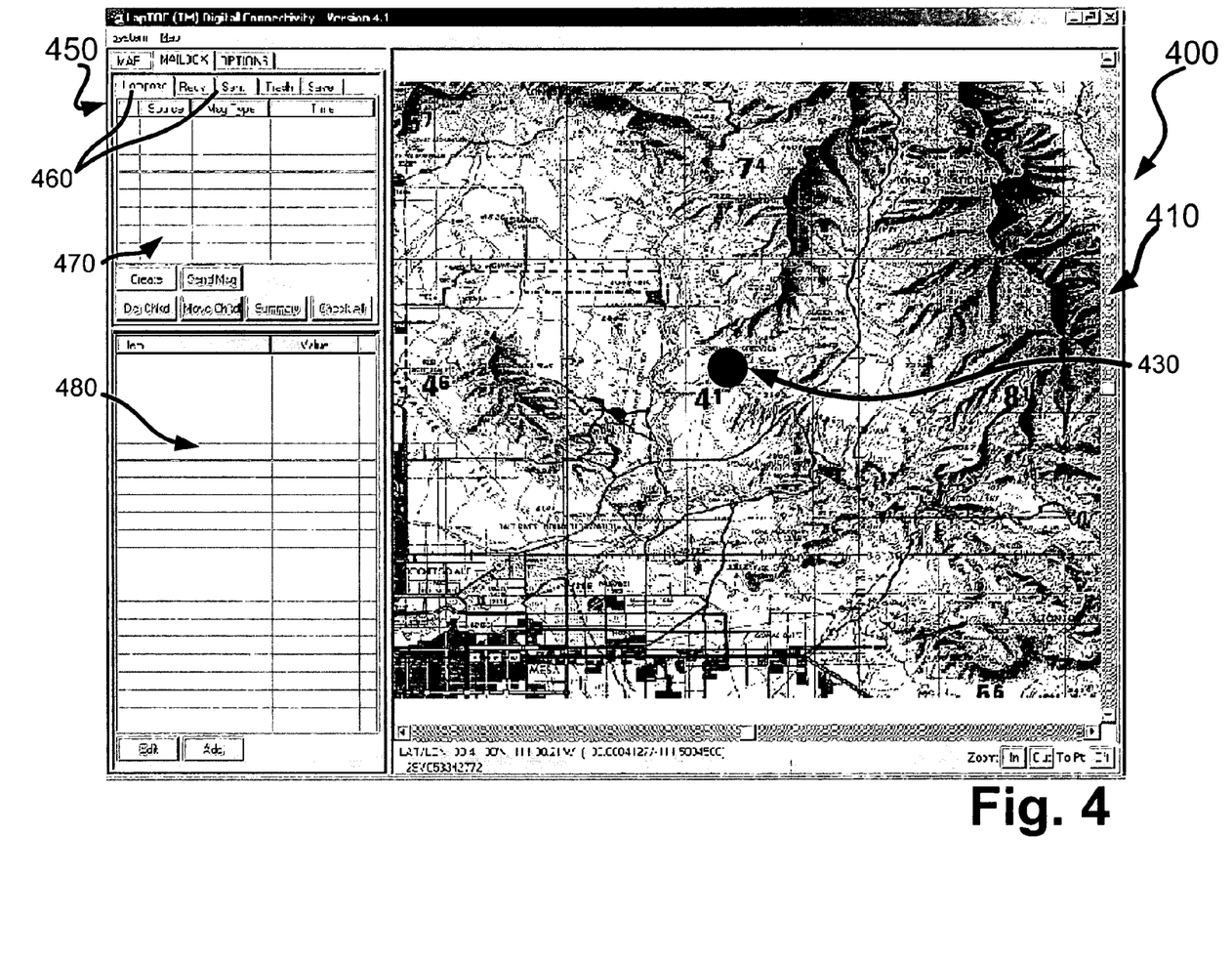
FIG. 4 is a screen shot of a display presented by an embodiment of the present invention showing a map displaying a symbol depicting a position associated with a communication and a message interface.

FIG. 4 is a screen shot 400 of a map 410 showing a symbol 430 depicting a position associated with a communication and a message interface 450. Using such a display advantageously allows a user to fully interact with the network 200 (FIG. 2) of aircraft 250 and other stations. The map 410 included in the screen shot 400, as previously described, is extracted from the map database 320 in order to include a position specified in a communication. The symbol 430 represents the position associated with that communication, whether the position is a location of a target, a location clear of targets, a current position of a reporting station, or other position information. Because the position for the symbol 430 is known, and boundaries of the map are known 410, the symbol 430 can be situated on the map 410 to reflect the position it represents.

As shown in FIG. 4, the message interface 450 is positioned along a left side of the map 410. The message interface 450 and the map 410 may be interconnected. Communications exchanged are associated with positions such as that marked by the symbol 430. Thus, selecting a communication displayed in the message interface 450 may cause a corresponding symbol 430 to be presented on the map 410, allowing a user to see the on the map the position related to the communication of interest. Alternatively, a user can select a symbol 430 displayed on the map 410 of a position of interest in order to view communications associated with the position of interest.

In one embodiment, the message interface 450 is presented in a "mailbox" type arrangement familiar to e-mail users. The message interface 450 includes a plurality of selectable tabs 460. Like the tabs in many graphical user interface-driven systems, selecting one of the tabs 460 with a pointing device brings forward elements associated with that tab. In this case, tabs are presented for composed messages, received messages, etc. A user can select the desired tab 460 with a pointing device to initiated desired functions.

In addition, in one embodiment, the message interface 450 includes two sections, an upper mailbox section 470 and a lower mailbox section 480. The upper mailbox section 470 presents a list of messages for each of the categories associated with the tabs 460. The list of messages presented in the upper mailbox section is analogous to the message listing included in common e-mail packages. The lower mailbox section 480 presents content associated with each of the messages. Thus, if a message is selected in the upper mailbox section 470, its contents will be listed in the lower mailbox section. The content presented in the lower mailbox section 480 suitably includes information such as the longitude and latitude of the position and other information.

Embodiments of the present invention advantageously simplify the process of sorting and composing messages of particular types. For example, in the context of Air Force Application Development Format (AFAPD) messages, there is a plurality of defined message types. To retrieve messages of a certain type, a user can use a pointing device to select one of the message types from a list. Similarly, to compose a message of a certain type, a user can select the desired message type from a list.

Figure 5:
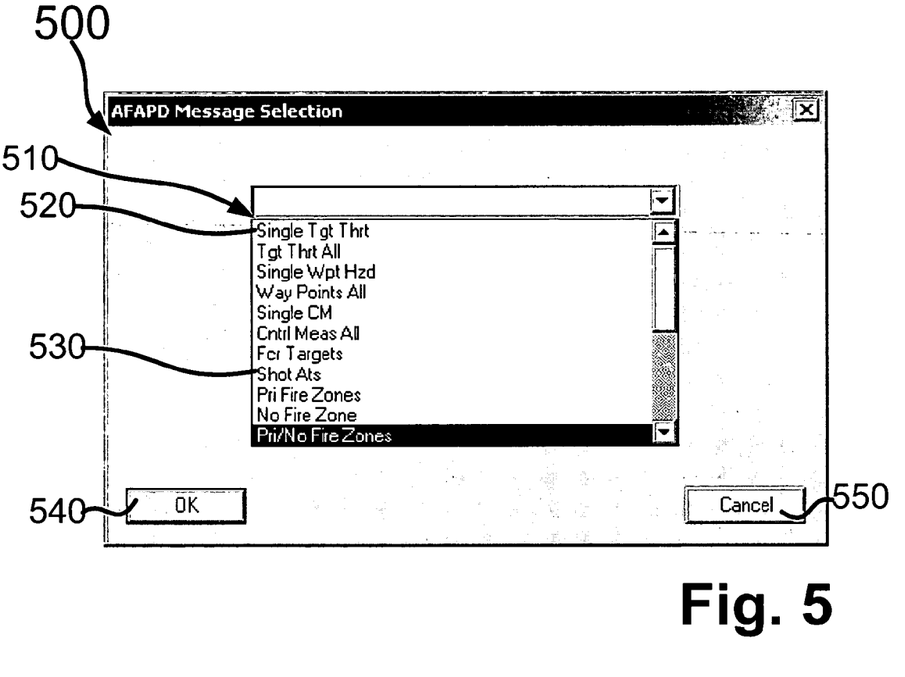
FIG. 5 is a screen shot showing a message type selection window.

FIG. 5 is a screen shot showing a message type selection window 500. The message type selection window includes a scrollable list of the message types selectable either the retrieve a list of messages of that category or to choose a message type to send. More specifically, FIG. 5 shows a message type selection window for selecting AFAPD message types from an AFAPD message type list 510. AFAPD message types may include, for example, "Single Tgt Thrt" 520 (single target threat) for information about a potential, unitary object viewed as a possible threat or target. For another example, AFAPD message types include "Shots Ats" 530 which, as the name indicates, are messages related to objects which have been fired upon. Using a familiar graphical user interface and a pointing device, a user selects a message type for which to review a list of messages or to create a new message. Once the appropriate message type is identified to be listed in the upper mailbox section 470 (FIG. 4), the user can select the "OK" button 540 to proceed with reviewing retrieved messages or adding additional content to a message being composed. The user can cancel the request by selecting the "Cancel" button 550 with the pointing device.

Figure 6:
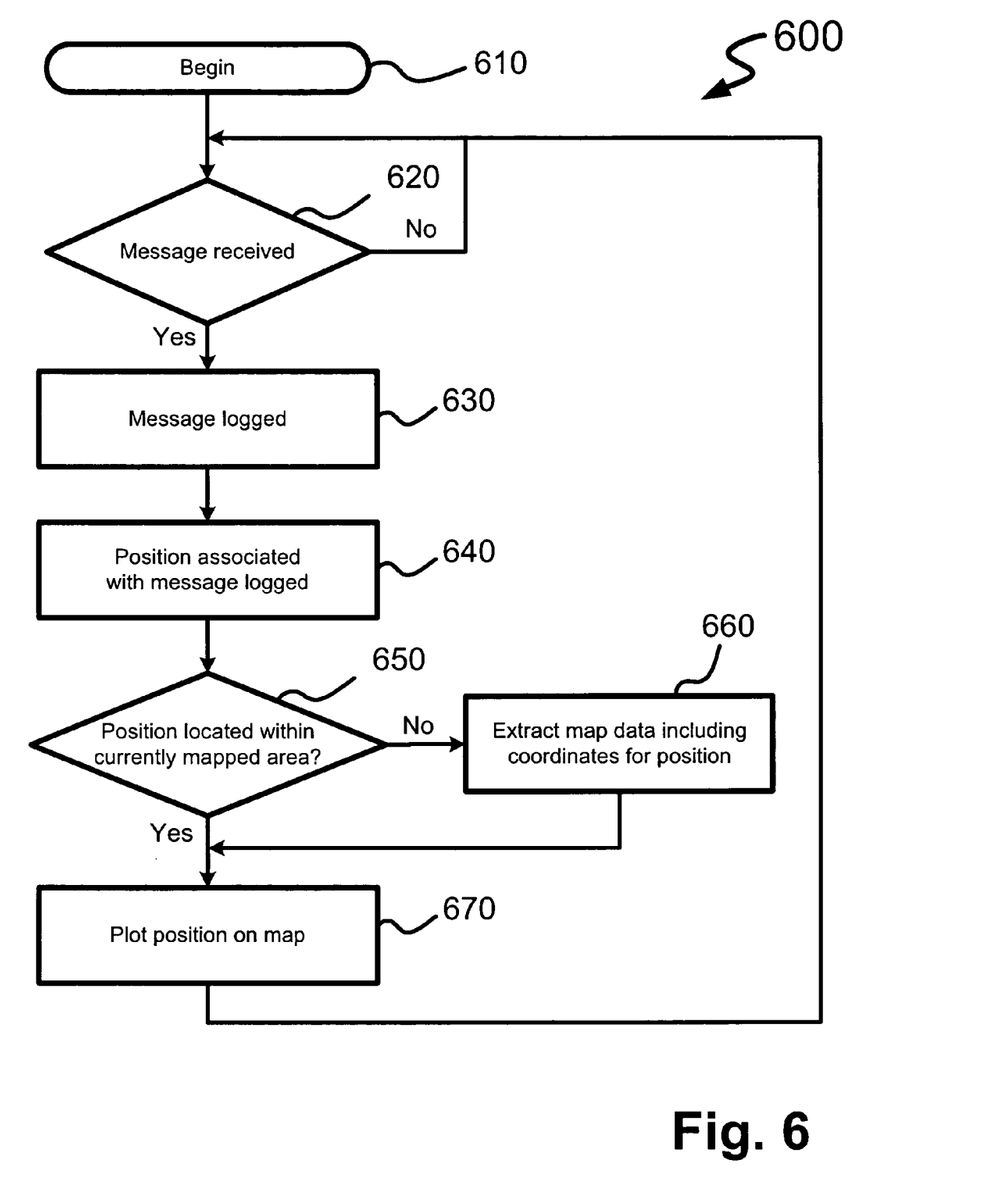
FIG. 6 is a flowchart of a routine for receiving and displaying messages.

FIG. 6 is a flowchart of a routine 600 for receiving and displaying messages. The routine 600 begins at a block 610. At a decision block 620 it is determined if a message or communication has been received. If not, the routine 600 loops back to the decision block 620 until a message is received. Once it has been determined at the decision block 620 that a message has been received, the message is logged at a block 630. At a block 640 a position associated with the message is logged. At a decision block 650 it is determined if the position is located within the area for which a map currently is presented. If not, at a block 660 map data including the area for the position is extracted. If it was determined at the decision block 650 that the map data desired already was available or was extracted at the block 660, at a block 670 the position is plotted on the map with a symbol. The routine 600 loops back to the decision block 620 to await receipt of the next message.

Figure 7:
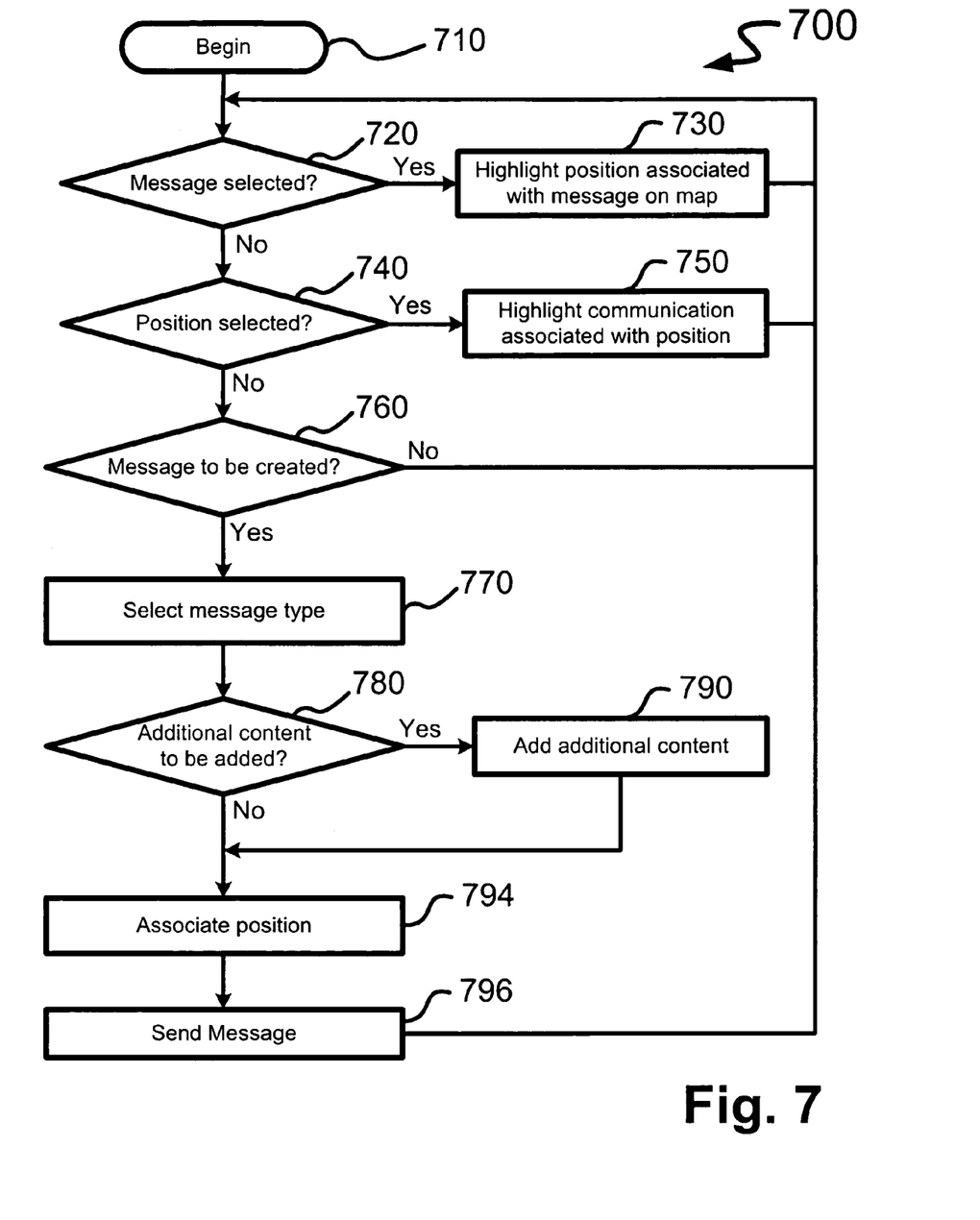
FIG. 7 is a flowchart of a routine for accessing and creating messages.

FIG. 7 is a flowchart of a routine 700 for accessing and creating messages. The routine 700 begins at a block 710. At a decision block 720 it is determined if a message has been selected for review by a user. If so, at a block 730 the position associated with the message is shown on a map to illustrate the position associated with the message. Once the process at the block 730 is completed, the routine 700 loops back to the decision block 720 to await receipt of a next command. From the foregoing description, it will be appreciated that instead of selecting a message individually a type of message can be selected from which the user can then proceed to select an individual message if desired.

If it is determined at the decision block 720 that a message has not been selected, but it is determined at a decision block 740 that a position marked with a symbol on the map has been selected, then at a block 750, a message or communication associated with the marked position is highlighted for review by the user. Once the process at the block 750 is completed, the routine 700 loops back to the decision block 720 to await receipt of a next command.

It is determined at the decision block 720 that a message has not been selected, and at the decision block 740 it is determined that a position has not been selected, then at a decision block 760 it is determined if the user has selected to create a message. If not, the routine 700 loops back to the decision block 720. However, if it is determined at the decision block 760 that a message is to be created, at a block 770 the message type is selected as described in connection with FIG. 5. Once the message type is selected, it is determined at a decision block 780 if additional content is to be added or edited. For example, AFAPD messages allow for a "Primary Fire Zone" message to be sent which involves the user specifying on the map corners of a fire zone. The outer parameters of the fire zone are additional content which the user would enter before transmitting the communication. If additional content is to be added or edited, the additional content is added or edited at a block 790. Once all content is included, at a block 794 a position with which the message is associated is applied. At a block 796 the message is sent. Once the message is sent at the block 796, the routine loops to the decision block 720 to await entry of the next command.

Apparatus and methods in accordance with the present invention may provide significant advantages over the prior art. For example, embodiments of the present invention may significantly improve communications and security between tactical, ground-based field commanders and the airborne aircraft within their command. Because embodiments of the present invention permit communications of important information digitally, the need for the ground-based commander to be in radio communication with the pilot or other personnel on-board the aircraft is reduced or eliminated. This advantageously improves the flow of information, and reduces the amount of work required from the pilot or other on-board personnel. Therefore, the overall performance of the aircraft, aircraft personnel, and field commander may be improved.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer-readable medium having instructions stored thereon, the computer-readable medium comprising:
    a first computer program portion to facilitate communications with a remote station;
    a second computer program portion to identify from a communication a position of the remote station associated with the communication, the communication being between the remote station and at least another remote station;
    a third computer program portion to present a map of an area proximate to the position and display a symbol on the map representing the position; and
    a fourth computer program portion to present a user interactive message interface showing at least a portion of an additional content of the communication associated with the position, wherein the at least a portion of the additional content includes at least one message.

2. The computer-readable medium of claim 1, wherein the first computer program portion exchanges messages in at least one of Air Force Application Program Development format, Joint Variable Message Format, and Tactical Fire Direction System format.

3. The computer-readable medium of claim 2, wherein the first computer program portion exchanges messages over a Personal Computer Improved Digital Modem interface device over at least one of a Single Channel Ground and Airborne Radio System and a Multiband Intra-Team Radio system.

4. The computer-readable medium of claim 1, wherein the third computer program portion extracts the map from a map database according to the position.

5. The computer-readable medium of claim 4, wherein the third computer program portion represents the position on the map as an application overlay.

6. The computer-readable medium of claim 5, wherein the third computer program portion uses known positions represented by the map extracted from the database to generate an overlay of the position to be displayed on the map.

7. The computer-readable medium of claim 1, further comprising fifth computer portion to allow a user to manipulate presentation of the map.

8. The computer-readable medium of claim 7, wherein the user can manipulate the map with a group of commands including at least one of zoom in, zoom out, manually fit map to user specifications, or fit map to view the position and a current position of the user.

9. The computer-readable medium of claim 1, further comprising a sixth computer program portion to present a graphical user interface, and wherein the user interactive message interface allows a user to engage the computer-readable medium with a pointing device.

10. The computer-readable medium of claim 9, wherein the user interactive message interface includes a message log listing a plurality of messages corresponding with a plurality of displayed positions such that selecting a message highlights a symbol corresponding with the displayed position for the message.

11. The computer-readable medium of claim 9, wherein the user interactive message interface is presented along at least one side of the map.

12. The computer-readable medium of claim 9, wherein the user interactive message interface includes a plurality of selectable tabs collecting messages groups including at least some of received messages, sent messages, messages being composed, messages to be saved, and messages to be deleted.

13. The computer-readable medium of claim 9, wherein the user interactive message interface includes a plurality of selectable attributes for each message, the selectable attributes including at least some of message sender, time of sending, and type of message.

14. The computer-readable medium of claim 9, further comprising a seventh computer program portion to allow a message to be created by a user.

15. The computer-readable medium of claim 14, wherein the user can select a position on the map with which the message to be created is associated.

16. The computer-readable medium of claim 14, wherein the user interactive message interface includes a plurality of selectable message types for messages being composed.

17. The computer readable medium of claim 1, wherein the user interactive message interface enables a user to:
receive and view information contained in the communication associated with the position;
generate the communication associated with the position; and
modify the communication associated with the position.

18. A computer-readable medium having instructions stored thereon, the computer-readable medium comprising:
a first computer program portion to facilitate communication with a remote station using at least one of Air Force Application Program Development format, Joint Variable Message Format, and Tactical Fire Direction System format;
a second computer program portion to identify from a communication a position of the remote station associated with the communication, the communication being between the remote station and at least another remote station;
a third computer program portion to extract a map from a map database and present a map of an area proximate to the position displaying a symbol on the map representing the position;
a fourth computer program portion to present a user interactive message interface showing at least a portion of additional content of the communication associated with the position; and
a fifth computer program portion to present a graphical user interface, wherein the user interactive message interface is configured to enable a user to engage the computer-readable medium with a pointing device.

19. The computer-readable medium of claim 18, wherein the remote station includes an aircraft.

20. The computer-readable medium of claim 18, wherein the first computer program portion exchanges messages over a Personal Computer Improved Digital Modem interface device over at least one of a Single Channel Ground and Airborne Radio System and a Multiband Intra-Team Radio system.

21. The computer-readable medium of claim 18, wherein the third computer program portion represents the position on the map as an application overlay.

22. The computer-readable medium of claim 21, wherein the third computer program portion uses known positions represented by the map extracted from the database to generate an overlay of the position to be displayed on the map.

23. The computer-readable medium of claim 18, further comprising a sixth computer program portion allows a user to manipulate presentation of the map.

24. The computer-readable medium of claim 23, wherein the user can manipulate the map with a group of commands including at least one of zoom in, zoom out, manually fit map to user specifications, or fit map to view the position and a current position of the user.

25. The computer-readable medium of claim 18, wherein the user interactive message interface includes a message log listing a plurality of messages corresponding with a plurality of displayed positions such that selecting a message highlights a symbol corresponding with the displayed position for the message.

26. The computer-readable medium of claim 18, wherein the user interactive message interface is presented along at least one side of the map.

27. The computer-readable medium of claim 18, wherein the user interactive message interface includes a plurality of selectable tabs collecting messages groups including at least some of received messages, sent messages, messages being composed, messages to be saved, and messages to be deleted.

28. The computer-readable medium of claim 18, wherein the user interactive message interface includes a plurality of selectable attributes for each message, the selectable attributes including at least some of message sender, time of sending, and type of message.

29. The computer-readable medium of claim 18, further comprising an eighth computer program portion to enable a message to be created by a user.

30. The computer-readable medium of claim 29, wherein the user can select a position on the map with which the message to be created is associated.

31. The computer-readable medium of claim 29, wherein the user interactive includes a plurality of selectable message types for messages being composed.

32. The computer-readable medium of claim 18, wherein the user interactive message interface enables a user to:
receive and view information contained in the communication associated with the position;
generate the communication associated with the position; and
modify the communication associated with the position.

33. A method for communicating, the method comprising:
receiving a communication from a remote station;
identifying a position of the remote station associated with the communication, the communication being between the remote station and at least another remote station;
presenting a map of an area proximate to the position;
displaying a symbol on the map representing the position; and
presenting an additional content of the communication via a user interactive message interface showing at least a portion of the additional content of the communication associated with the position, wherein the additional content includes at least one message.

34. The method of claim 33, wherein the remote station includes an aircraft.

35. The method of claim 33, wherein the communication includes at least one message in at least one of Air Force Application Program Development format, Joint Variable Message Format, and Tactical Fire Direction System format.

36. The method of claim 35, further comprising receiving at least one message over a Personal Computer Improved Digital Modem interface device over at least one of a Single Channel Ground and Airborne Radio System and a Multi-band Intra-Team Radio system.

37. The method of claim 33, further comprising extracting the map from a map database according to the position.

38. The method of claim 37, further comprising representing the position on the map as an application overlay.

39. The method of claim 38, further comprising using a known position represented by the map extracted from the database to generate an overlay of the position to be displayed on the map.

40. The method claim 33, further comprising allowing a user to manipulate presentation of the map.

41. The method of claim 40, wherein the user can manipulate the map with a group of commands including at least one of zoom in, zoom out, manually fit map to user specifications, or fit map to view the position and a current position of the user.

42. The method of claim 33, further comprising presenting a graphical user interface to be engaged with a pointing device.

43. The method of claim 42, wherein a user interactive message interface includes a message log listing a plurality of messages corresponding with a plurality of displayed positions such that selecting a message highlights a symbol corresponding with the displayed position for the message.

44. The method of claim 43, wherein the user interactive message interface is presented along at least one side of the map.

45. The method of claim 43, wherein the user interactive message interface includes a plurality of selectable tabs collecting messages groups including at least some of received messages, sent messages, messages being composed, messages to be saved, and messages to be deleted.

46. The method of claim 43, wherein the user interactive message interface includes a plurality of selectable attributes for each message, the selectable attributes including at least some of message sender, time of sending, and type of message.

47. The method of claim 43, further comprising allowing a message to be created by a user.

48. The method of claim 47, wherein the user can select a position on the map with which the message to be created is associated.

49. The method of claim 47, wherein the user interactive message interface includes a plurality of selectable message types for messages being composed.

50. A communications system, the system comprising:
a radio configured to receive a communication from a remote station; and
a portable computer operably coupled with the radio, the portable computer comprising:
a display;
a position identifier operable to determine from the communication a position of the remote station associated with the communication, the communication being between the remote station and at least another remote station;
a map presenter configured to present the position on a map of an area proximate to the position on the display; and
a user interactive message interface configured to present content of the communication associated with the position including at least one message.

51. The system of claim 50, wherein the communication includes at least one message in at least one of Air Force Application Program Development format, Joint Variable Message Format, and Tactical Fire Direction System format.

52. The system of claim 51, wherein the portable computer is operably coupled with the radio using a Personal Computer Improved Digital Modem interface.

53. The system of claim 52, wherein the radio includes at least one of a Single Channel Ground and Airborne Radio System and a Multiband Intra-Team Radio system.

54. The system of claim 50, further comprising a map database configured to extract map data according to the position.

55. The system of claim 54, wherein the position on the map is presented as an application overlay.

56. The system of claim 54, the position is displayed on the map by using known positions represented by the map extracted from the database to generate an overlay of the position to be displayed on the map.

57. The system of claim 50, further comprising a user interface to allow a user to manipulate presentation of the map.

58. The system of claim 57, wherein the user interface includes a group of commands including at least one of zoom in, zoom out, manually fit map to user specifications, or fit map to view the position and a current position of the user.

59. The system of claim 50, further comprising a graphical user interface supported by the personal computer, the graphical user interface to be engaged with a pointing device.

60. The system of claim 59, wherein the user interactive message interface includes a message log listing a plurality of messages corresponding with a plurality of displayed positions such that selecting a message highlights a symbol corresponding with the displayed position for the message.

61. The system of claim 59, wherein the user interactive message interface is presented along at least one side of the map.

62. The system of claim 59, wherein the user interactive message interface includes a plurality of selectable tabs collecting messages groups including at least some of received messages, sent messages, messages being composed, messages to be saved, and messages to be deleted.

63. The system of claim 59, wherein the user interactive message interface includes a plurality of selectable attributes for each message, the selectable attributes including at least some of message sender, time of sending, and type of message.

64. The system of claim 59, further comprising a message creation facility by a user.

65. The system of claim 64, wherein the message creation facility allows the user to select a position on the map with which the message to be created is associated.

66. The system of claim 65, wherein the message creation facility includes a plurality of selectable message types for messages being composed.

67. The system of claim 50, wherein the user interactive enables a user to:

receive and view information contained in the communication associated with the position;

generate the communication associated with the position; and modify the communication associated with the position.

* * * * *